United States Patent
Karimibiuki et al.

(10) Patent No.: US 12,039,055 B2
(45) Date of Patent: Jul. 16, 2024

(54) AUTOMATIC FUZZ TESTING FRAMEWORK

(71) Applicant: SOPHOS LIMITED, Abingdon (GB)

(72) Inventors: Mehdi Karimibiuki, Vancouver (CA); Craig Paradis, Bolton, MA (US)

(73) Assignee: Sophos Limited, Abingdon (GB)

( * ) Notice: Subject to any disclaimer, the term of this patent is extended or adjusted under 35 U.S.C. 154(b) by 362 days.

(21) Appl. No.: 17/491,208

(22) Filed: Sep. 30, 2021

(65) Prior Publication Data
US 2023/0100142 A1 Mar. 30, 2023

(51) Int. Cl.
| | |
|---|---|
| G06F 21/00 | (2013.01) |
| G06F 11/36 | (2006.01) |
| G06F 16/2457 | (2019.01) |
| G06F 16/2458 | (2019.01) |
| G06F 16/248 | (2019.01) |
| G06F 16/28 | (2019.01) |
| G06F 21/57 | (2013.01) |
| G06N 7/02 | (2006.01) |

(52) U.S. Cl.
CPC ........ *G06F 21/577* (2013.01); *G06F 11/3684* (2013.01); *G06F 11/3688* (2013.01); *G06F 16/24578* (2019.01); *G06F 16/2468* (2019.01); *G06F 16/248* (2019.01); *G06F 16/285* (2019.01); *G06N 7/02* (2013.01); *G06F 2221/033* (2013.01)

(58) Field of Classification Search
CPC ............... G06F 21/577; G06F 11/3684; G06F 11/3688; G06F 16/24578; G06F 16/2468; G06F 16/248; G06F 16/285; G06F 2221/033; G06N 7/02; G06N 20/10
See application file for complete search history.

(56) References Cited

U.S. PATENT DOCUMENTS

| | | | | |
|---|---|---|---|---|
| 10,983,901 B1 * | 4/2021 | Pearce | ............... | G06F 11/3688 |
| 2008/0184079 A1 * | 7/2008 | Merriman | ........... | G06F 11/3664 |
| | | | | 714/48 |
| 2008/0256340 A1 * | 10/2008 | Conger | ................. | G06F 21/577 |
| | | | | 712/217 |
| 2013/0212435 A1 * | 8/2013 | Qiu | ....................... | G06F 11/263 |
| | | | | 714/E11.178 |
| 2013/0340083 A1 * | 12/2013 | Petrica | ................... | G06F 21/577 |
| | | | | 714/37 |
| 2019/0197243 A1 * | 6/2019 | Hendrickx | ............ | G06F 16/148 |
| 2021/0326246 A1 * | 10/2021 | Li | .......................... | G06F 21/14 |

* cited by examiner

*Primary Examiner* — Ka Shan Choy
(74) *Attorney, Agent, or Firm* — IP Spring

(57) ABSTRACT

Various aspects related to methods, systems, and computer readable media for automatic fuzz testing. An example method of automatic software fuzz testing can include, receiving a description of a target software application, determining, based on the description, a type of fuzzing, identifying one or more fuzzers based on the type of fuzzing, executing the one or more fuzzers on the target software application, extracting prioritized results of the executing of the one or more fuzzers, and, presenting the prioritized results.

18 Claims, 6 Drawing Sheets

AUTOMATIC FUZZ TESTING FRAMEWORK

TECHNICAL FIELD

Embodiments relate generally to software threat management, and more particularly, to methods, systems, and computer readable media for automatic fuzz testing of software.

BACKGROUND

With continually evolving computer security threats, there remains a need for automated, semi-automated, and manual techniques to identify security threats and vulnerabilities in newly developed software.

SUMMARY

Implementations of this application relate to methods, systems, and computer readable media for automatic fuzz testing of software.

In one aspect, a computer-implemented method is disclosed. The computer-implemented method comprises: receiving a description of a target software application; determining, based on the description, a type of fuzzing; identifying one or more fuzzers based on the type of fuzzing; executing the one or more fuzzers on the target software application; extracting prioritized results of the executing of the one or more fuzzers; and presenting the prioritized results.

Various implementations of the computer-implemented method are disclosed.

In some implementations, the prioritized results are extracted from a log, and the method further comprises: prior to the extracting, aggregating results of the executing of the one or more fuzzers into the log.

In some implementations, the computer-implemented method further comprises: generating the description of the target software application using a machine learning algorithm, wherein the description includes one or more artifacts of the target software application that are representative of one or more of: code language or organization of code.

In some implementations, receiving the description of the target software comprises receiving a configuration file that includes a description of artifacts of the target software application, the artifacts including one or more of: code language or organization of code.

In some implementations, the determining the type of fuzzing comprises determining a subset of available fuzzers, wherein each fuzzer of the subset of available fuzzers matches at least one of: code language of the target software application or organization of code of the target software application.

In some implementations, the identifying the one or more fuzzers comprises ranking each fuzzer of the subset of fuzzers based on a similarity between an output profile of the fuzzer and the description of the target software application.

In some implementations, the executing the one or more fuzzers on the target software application comprises, for each fuzzer, providing an input profile of the target software application, wherein the executing is performed within a computational budget.

In some implementations, the aggregating the results of the executing of the one or more fuzzers comprises, for each fuzzer, receiving results from the fuzzer and storing the results in the log.

In some implementations, the extracting the prioritized results comprises: categorizing each of the aggregated results into one or more categories of software defects; for each category, prioritizing individual software vulnerabilities; and outputting the prioritized individual software vulnerabilities organized based on the one or more categories.

In some implementations, the computer-implemented method further comprises automatically opening a service ticket indicative of a software vulnerability based on the prioritized results.

In another aspect, a non-transitory computer-readable medium is disclosed. The non-transitory computer-readable medium has instructions stored thereon that, responsive to execution by a processing device, causes the processing device to perform operations comprising: receiving a description of a target software application; determining, based on the description, a type of fuzzing; identifying one or more fuzzers based on the type of fuzzing; executing the one or more fuzzers on the target software application; extracting prioritized results of the executing of the one or more fuzzers; and presenting the prioritized results.

Various implementations of the non-transitory computer-readable medium are disclosed.

In some implementations, the operations further comprise: generating the description of the target software application using a machine learning algorithm, wherein the description includes one or more artifacts of the target software application that are representative of one or more of: code language or organization of code.

In some implementations, receiving the description of the target software comprises receiving a configuration file that includes a description of artifacts of the target software application, the artifacts including one or more of: code language or organization of code.

In some implementations, the determining the type of fuzzing comprises determining a subset of available fuzzers, wherein each fuzzer of the subset of available fuzzers matches at least one of: code language of the target software application or organization of code of the target software application.

In some implementations, the identifying the one or more fuzzers comprises ranking each fuzzer of the subset of fuzzers based on a similarity between an output profile of the fuzzer and the description of the target software application.

In some implementations, the executing the one or more fuzzers on the target software application comprises, for each fuzzer, providing an input profile of the target software application, wherein the executing is performed within a computational budget.

In some implementations, the aggregating the results of the executing of the one or more fuzzers comprises, for each fuzzer, receiving results from the fuzzer and storing the results in a log.

In some implementations, the extracting the prioritized results comprises: categorizing each of the aggregated results into one or more categories of software defects; for each category, prioritizing individual software vulnerabilities; and outputting the prioritized individual software vulnerabilities organized based on the one or more categories.

In some implementations, the operations further comprise automatically opening a service ticket indicative of a software vulnerability based on the prioritized results.

In another aspect, a computer system to perform automatic fuzz testing is disclosed. The computer system comprises: a memory with instructions stored thereon; and a processing device, coupled to the memory, the processing device configured to access the memory and execute the instructions, wherein the instructions cause the processing device to perform operations including: receiving a description of a target software application; determining, based on the description, a type of fuzzing; identifying one or more fuzzers based on the type of fuzzing; executing the one or more fuzzers on the target software application; aggregating results of the executing of the one or more fuzzers into a log; extracting prioritized results from the log of aggregated results; and presenting the extracted prioritized results in a graphical user interface, wherein the graphical user interface is configured to display higher priority software vulnerabilities to a user automatically.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
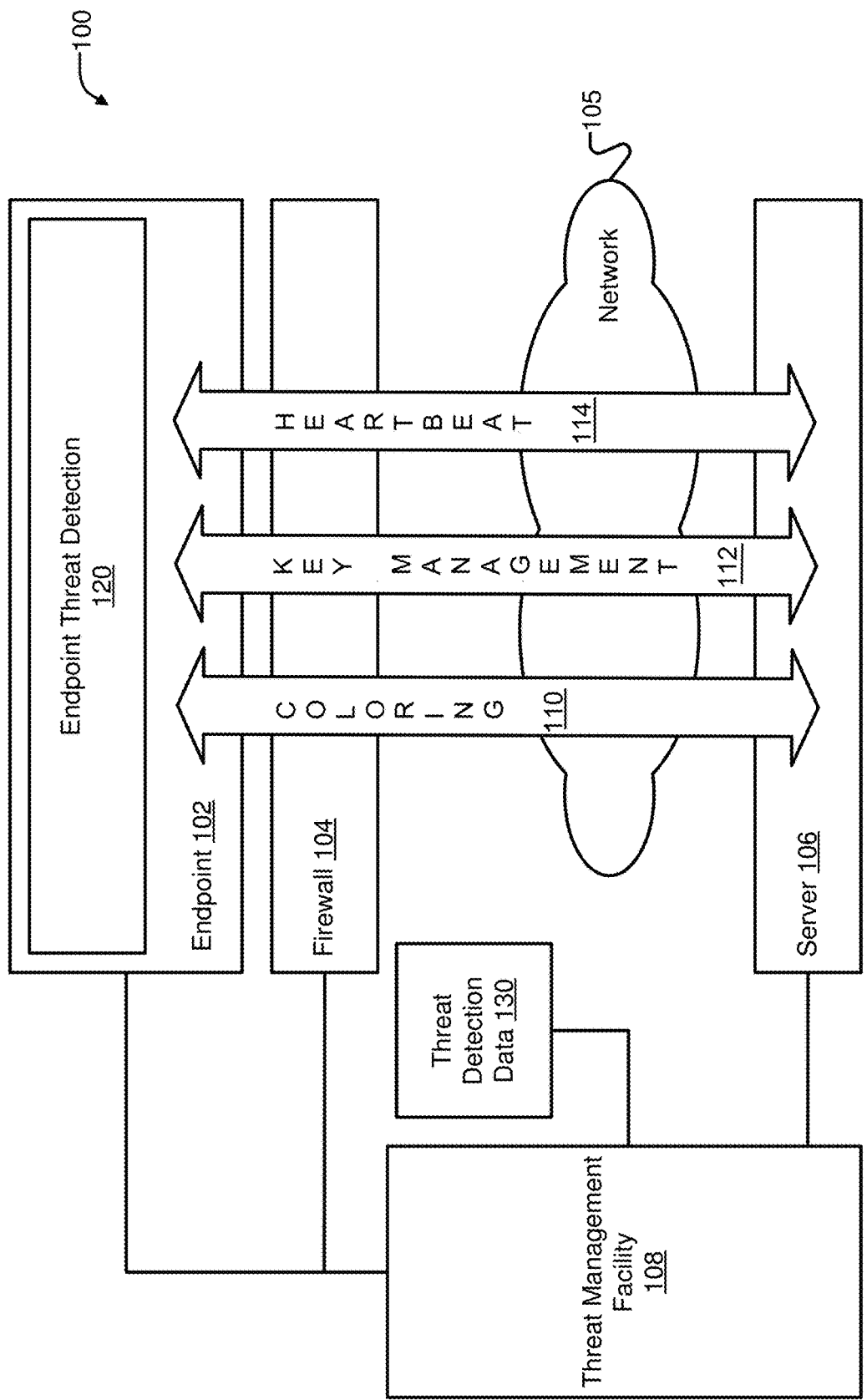
FIG. 1 is a block diagram of an example enterprise network threat management system, in accordance with some implementations.

Fuzz testing, also referred to as fuzzing, is a software testing technique which uses a fuzzer to find implementation bugs using injection of generated test data, such as malformed or semi-malformed data, in an automated fashion. A fuzzer is a computer program which automatically injects different data into a program/stack to detect software bugs. The injected data can be based on automated data generators, and vulnerability identification can rely on debugging tools. Data generators usually use combinations of static fuzzing vectors (e.g., known-to-be-dangerous values), generation or modification of test data according to patterns or rules, or random data. Some fuzzers may use genetic algorithms to link injected data and observed impact of the tested software (e.g., target software).

One or more implementations described herein relate to automatic fuzz testing of software, determining appropriate fuzzers for the automatic fuzz testing of software, and to correct or minimize software threats based on the automatic fuzz testing of software. Generally, newly developed software may undergo a series of development milestones and be subjected to various debugging techniques prior to exhibition or delivery. While typical debugging techniques may identify software vulnerabilities that are easily decipherable to a developer, it is intractable for a developer to establish, without a doubt, that a particular piece of software is free from vulnerabilities. By using an appropriate fuzzer, however, a large amount of test data may be injected into a target software application to more readily determine software vulnerabilities and therefore provide a software product with lower number of software vulnerabilities.

While fuzzers are readily available tools accessible through a plurality of software testing websites and other repositories, the large number of unique fuzzers available, quality of data injection, and other testing metrics, may be difficult for software developers to easily understand, and therefore difficult for a software developer to select and use an appropriate fuzzer or fuzzers to use for a given software application. For example, fuzzers may be configured to inject random, semi-random, and other data based on operational characteristics of the target software. If a particular target software application has software vulnerabilities not associated with the particular data injection profile of the chosen fuzzer, the testing or fuzzing results may be less impactful or may fail to identify certain software vulnerabilities.

According to implementations described herein, a framework for automatic fuzz testing of software may automatically determine an appropriate fuzzer (or multiple fuzzers) for software testing, deploy testing with the fuzzer (or multiple fuzzers), and organize results of the fuzz testing for display to a developer. The fuzz testing results may be organized based on a hierarchy or priority of software vulnerabilities, such that a developer may more readily concentrate on securing or managing the most urgent vulnerabilities. Further iteration through the framework for automatic fuzz testing, and organization of the plurality of results of the iterative fuzz testing, may result in a holistic view of software vulnerabilities that otherwise may have been missed when using only a default or basic fuzzer, or using an inappropriate fuzzer based on the target software application.

The below detailed description is presented in reference to these and other scenarios where software developers can benefit from automatic fuzz testing of target software applications, and/or from identifying potential security threats prior to software exhibition or delivery.

FIG. 1 illustrates a threat management system according to some implementations. In general, the system 100 may include an endpoint 102, a firewall 104, a server 106 and a threat management facility 108 coupled to one another directly or indirectly through a data network 105. Each of the entities depicted in FIG. 1 may, for example, be implemented on one or more computing devices such as the computing device described below with reference to FIG. 6. A number of systems may be distributed across these various components to support threat detection, such as a coloring system 110, a key management system 112, and a heartbeat system 114 (or otherwise an endpoint health system), each of which may include software components executing on any of the foregoing system components, and each of which may communicate with the threat management facility 108 and an endpoint threat detection agent 120 executing on the endpoint 102 to support improved threat detection and remediation.

The endpoint 102 may, for example, include a desktop or other computing device such as a laptop, tablet mobile device, cellular phone, virtual machine, server, or any other physical or virtual device that might couple to the network 105 to communicate with other devices and endpoints.

In general, the threat management facility 108 may help to secure the endpoint 102 and other devices coupled to an enterprise network against malicious software or other threats such viruses, spyware, adware, trojans, intrusion, spam, phishing explorations, policy abuse, uncontrolled access and the like. Regardless of how categorized, the threat may need to be stopped at various points of a networked computing environment, such as the endpoint 102, the firewall 104, the server 106 and/or the threat management facility 108, or any other devices such as laptops, cellular phones, desktops, servers, gateways, communication ports, handheld or mobile devices, firewalls, and the like, and the threat management facility 108 may help to generally coordinate detection and remediation in this context.

In one aspect, this may include email security and control, e.g., where security management may help to eliminate spam, viruses, spyware and phishing, control of email content, and the like. The threat management facility 108 may also help to protect against other inbound and outbound threats, protect email infrastructure, prevent data leakage, provide spam filtering, and the like. The threat management facility may support other security techniques and services such as reporting on suspect devices, security and content filtering, active monitoring of network traffic, URI filtering, network access control, access to virtual private networks (VPN), host intrusion prevention, and so forth.

The system 100 may employ threat detection data 130, such as a threat detection model based on automatic fuzz testing results, logs of tested software, and/or other data, to assist in analyzing software to detect malicious code. The threat detection data 130 may also include machine learning models trained on known malicious software to aid in identifying, isolating, and mitigating threats from malicious software.

The coloring system 110 may be used to label or color software objects for improved tracking and detection of potentially harmful activity. The coloring system 110 may, for example, label files, executables, processes, network communications, data sources and so forth with any suitable label. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. A network communication stream may inherit a color from the application that launched it, a machine that communicated it, and so forth. More generally, any type of labeling, as well as rules for propagating, inheriting, changing, or otherwise manipulating such labels, may be used by the coloring system 110 as contemplated herein. A coloring model, alone or in combination with other classifications, detections, or characteristics, may be used to assign one or more colors.

The key management system 112 may support management of keys for the endpoint 102 in order to selectively permit or prevent access to content on the endpoint 102 on a file-specific basis, a process-specific basis, an application-specific basis, a user-specific basis, or any other suitable basis in order to prevent data leakage, and in order to support more fine-grained and immediate control over access to content on the endpoint 102 when a security compromise is detected. Thus, for example, if a particular process executing on the endpoint is compromised, or potentially compromised or otherwise under suspicion, as determined by a model, alone or in combination with other classifications, detections, or characteristics, access by that process may be blocked (e.g., with access to keys revoked) in order to prevent, e.g., data leakage or other malicious activity.

The heartbeat system 114 may be used to provide periodic or aperiodic information from the endpoint 102 or other system components about system health, security, status, and so forth. The heartbeat system 114 or otherwise an endpoint health system may thus in general include a health status report system for the endpoint 102, such as through the use of a heartbeat system or the like. A heartbeat may be encrypted or plaintext, or some combination of these, and may be communicated unidirectionally (e.g., from the endpoint 108 to the threat management facility 108) or bidirectionally (e.g., between the endpoint 102 and the server 106, or any other pair of system components) on any useful schedule. In some implementations, the heartbeat system 114 may be used to securely communicate information about the health status of a device. In some implementations, the heartbeat system 114 may be used to communicate color information or other information (e.g., user information, source information, process information) about files, executables, processes, network communications, data sources and so forth. For example, a firewall 104 may use the heartbeat system 114 to request information from an endpoint 102 about an application associated with a network communication. For example, a firewall 104 may use the heartbeat system 114 to direct an endpoint 102 to take action to manage the endpoint 102 or the system 100 in response to a potential or actual security threat or for administrative purposes. For example, an endpoint 102 may use the heartbeat system 114 to communicate a determination by the endpoint threat detection agent 120 to other network entities or locations. In some implementations, the heartbeat system 114 may be used to communicate fuzzing outputs, such as an output from any of the fuzz testing techniques described herein, either alone or in combination with other classifications, detections, or characteristics, with respect to detections on files, executables, processes, network communications, data sources and so forth.

While the system 100 may be organized as an enterprise threat detection and management system, the same may be varied in many ways. For example, and without limitation, the system 100 may include software development facilities to facilitate the development and automatic fuzz testing of developed software. The automatic fuzz testing may be used to update the threat detection data 130, and/or provide software signatures of pre-tested software to enable monitoring of newly tested/developed software to ensure only tested software is deployed through the system 100.

For example, in some implementations, an application may be subjected to automatic fuzz testing, and input data associated with vulnerabilities may be identified. Input data associated with vulnerabilities may be provided to the threat management facility 108. The threat management facility may provide detection data 130 that may be used to recognize the use of input data associated with a vulnerability. The Endpoint Threat Detection 120 may use the detection data 130 to recognize an attempt to apply the input data associated with a vulnerability to an application running on the endpoint. This may result in a threat detection, coloring the application attempting to apply the input data, coloring the application to which the data was applied, and so forth.

For example, in some implementations, a software application tested with the fuzz testing techniques described herein may be deployed in the system 100, for example, on the endpoint 102, as part of endpoint threat detection 120 or otherwise, as part of the firewall 104, in the threat management facility 108, or on the server 106. The use of the fuzz testing techniques makes the applications so tested more robust and secure, contributing to the overall security of system 100.

For example, and turning to FIG. 2, an automatic fuzz testing framework that is deployable in the system 100 is described below.

Figure 2:
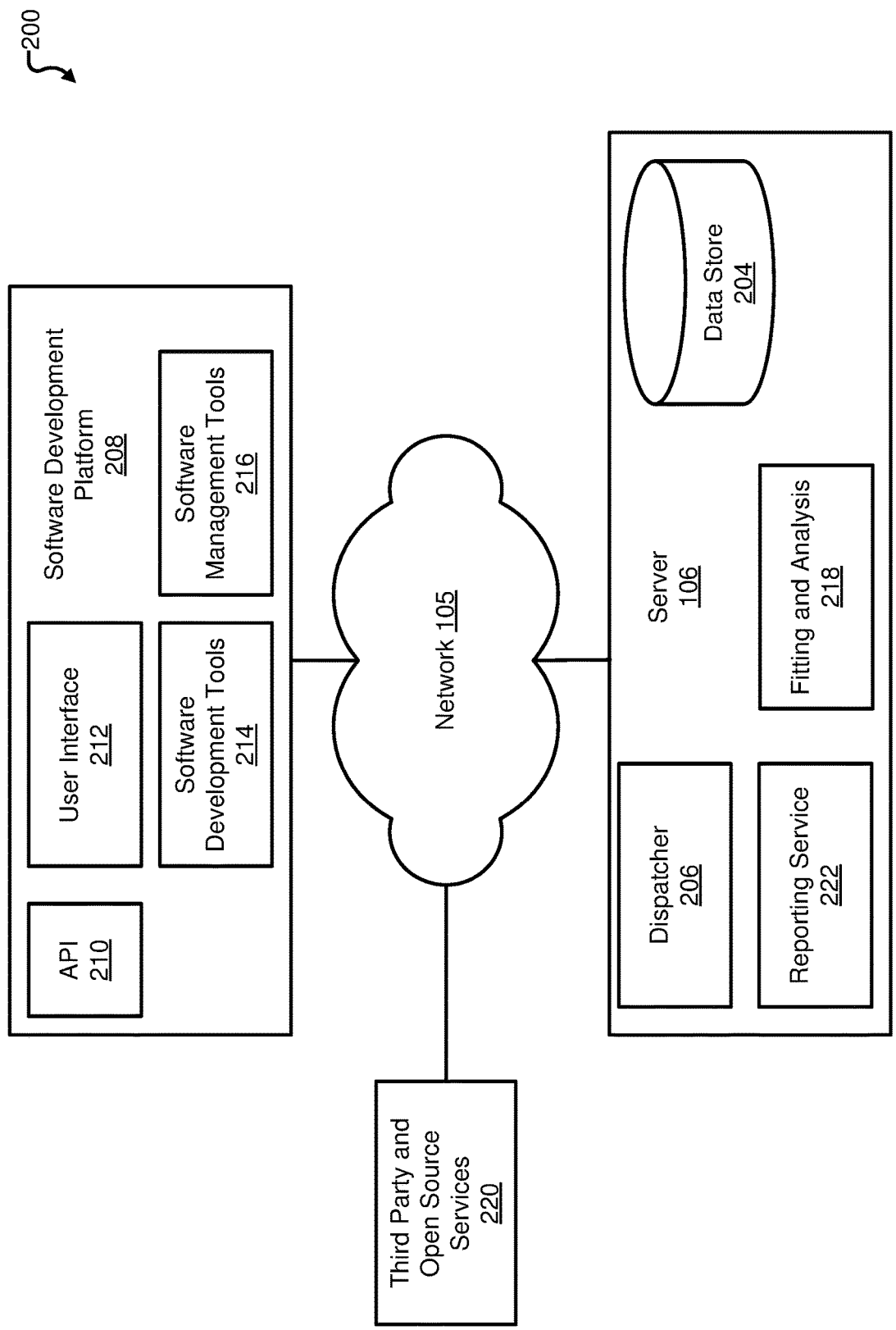
FIG. 2 is a block diagram of an example automatic fuzz testing framework, in accordance with some implementations.

FIG. 2 is a block diagram of an example automatic fuzz testing framework 200, in accordance with some implementations. The framework 200 may also be referred to as a "platform" or "network environment" herein. In general, the framework 200 may include the server 106, a software development platform 208, and third party and open source services 220, coupled to one another directly or indirectly through the data network 105. The platform 208 and services 220 may each be implemented on one or more servers or other suitable computing devices that are coupled to network 105. The platform 208 and the services 220 may, for example, each be implemented on one or more compute instances in a cloud computing infrastructure. Furthermore, each of the entities depicted in FIG. 2 may, for example, be implemented on one or more computing devices such as the computing device described below with reference to FIG. 6.

Framework 200 is provided for illustration. In some implementations, the framework 200 may include the same, fewer, more, or different elements configured in the same or different manner as that shown in FIG. 1 and FIG. 2.

In some implementations, data network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the software development platform 208 can include a server having one or more computing devices (e.g., a cloud computing system, a rackmount server, a server computer, cluster of physical servers, virtual server, etc.). In some implementations, a server may be included in the software development platform 208, be an independent system, or be part of another system or platform.

In some implementations, the software development platform 208 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the software development platform 208 and to provide a user (e.g., a software developer) with access to software development platform 208. The software development platform 208 may also include a website (e.g., one or more web pages) or application back-end software that may be used to provide a user with access to content provided by software development platform 208. For example, users (or developers) may access software development platform 208 using the user interface 212 on a client computing device or a computer access terminal.

In some implementations, software development platform 208 may provide connections between one or more third party service providers and/or enterprise networks that allows developers to communicate with other developers/employees via the software development platform 208, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "developer" may be represented as a single individual. However, other implementations of the disclosure encompass a "developer" being an entity with a set of users or a group or groups working to develop software. For example, a set of individual users federated as a group may be considered a single "developer," in some circumstances.

In some implementations, software development platform 208 may include software development provisions. For example, the platform may provide interfaces allowing the design, modification, and debugging of software, and other software development functions. In some implementations, a piece of developed software to be tested is referred to as "target software." The target software may be developed through the software development platform, be tested using the framework 200 for one or more software vulnerabilities, and implemented in a system (e.g., system 100) for deployment and use by an enterprise, individual, or a computer device. For example, the target software may be used in the Endpoint Threat Detection 120 or in the Firewall 104.

In general, the software development platform 208 may include various components and features including, for example, application programming interface (API) 210, user interface 212, software development tools 214, and software management tools 216. The software development platform 208 may be an independent system executed on a separate server, or may be included within the server 106. In some implementations, the software development platform 208 may be a distributed platform utilizing any number of computing devices and servers, may be a software-as-a-service platform offering software development utilities on an on-demand or other basis, may be implemented on one or more client or developer computing devices (e.g., as described with reference to FIG. 6), or any combination thereof.

Generally, the API 210 may be organized to include any number of software functions, commands, and/or interfaces configured to allow a software developer access to programming tools. For example, the API 210 may be exposed to a developer through the user interface 212, thereby allowing the developer to create software applications and components as computer-executable code portions for storage at a non-transitory computer-readable storage medium, and for execution at a suitable computer device. The API 210 may also include multiple APIs, in some implementations.

The user interface 212 may be a graphical user interface configured to present a developer with a computer interface used to create, edit, modify, and deploy software. In some implementations, the user interface 212 is further configured to allow a developer to establish testing protocols, modify testing parameters, implement testing configuration settings, and/or set testing parameters. In some implementations, the user interface 212 is further configured to present results of automatic fuzz testing for viewing and use by a developer. In some implementations, the user interface 212 is further configured to present a developer with automated and non-automated mitigation services for software vulnerabilities, including software tickets, prioritized vulnerability results, as well as logs of testing results for use in software debugging.

The software development tools 214 may include a collection of development tools that may be presented through the user interface 212, for example, to facilitate the development of software by a developer. The software development tools may include, but are not limited to, one or more software development kit(s), integrated development environment(s), computer-assisted software-engineering (CASE) tool(s), software repository(ies), software source code editor(s), software compiler(s), software profiler(s), and/or other software development tools. In at least one implementation, the software development tools 214 are further configured to allow access, through the user interface 212, to third party and open source services 220, for software creation using these services.

The software management tools 216 may include a collection of management tools or portions of the software development tools described above, that may be presented through the user interface 212, for example, to facilitate the management and testing of software by a developer. For example, the software management tools 216 may include, but are not limited to one or more runtime environment(s), debugging environment(s), testing environment(s), software repository(ies), virtual machine(s), image(s), and/or other software management tools. In at least one implementation, the software management tools 216 are further configured to allow access, through the user interface 212, to third party and open source services 220, for software management using these services.

In at least one implementation, the software management tools 216 are further configured to facilitate the creation of a software testing configuration file or configuration data. The software testing configuration data may be a set of data used to identify features and aspects of a target software program that is to be tested. In one implementation, the configuration data is stored/created in JavaScript Object Notation (JSON) format. For example, the configuration data may identify: a software API, a software language, a software organization, types of inputs required, runtime environment, and any other suitable data that may be used to identify a type of fuzzing required to identify software vulnerabilities. In some implementations, the configuration data may also include a time or computational budget, a description of a path or location, a description of fuzzing depth, and a description of static data.

Generally, the time or computational budget describes a "budget" for fuzzing of the target software. If this is specified in order of minutes or seconds, it determines that the fuzzing type is for continuous integration (CI) and continuous development (CD) routines. This refers to fuzzing that must occur briefly and therefore the fuzzer should take an express fuzzing route to only target the areas that are most vulnerable for exploring critical and high risk bugs (e.g., address areas of code that are going to be publicly exposed such as with public APIs, or areas that are having authorization and authentication methods implemented, such as password creation and recording).

Additionally, if a time or computational budget specifies time values such as hours and days for fuzzing, an exhaustive fuzzing type has been requested. Therefore, software management tools 216 may automatically select an algorithmically sequential strategy (e.g., breadth-first-search, depth-first search, travelling salesman, priority queue, etc.) for fuzzing. Fuzzing practices that takes hours or days are suitable for larger applications and legacy products where there is no continuous integration or dynamic development occurring. Usually, such products are released and well maintained. A user may also desire to conduct fuzzing on released software products to gain assurance on the product reliability and security certification (i.e., that no high or critical risk exists), or to identify errors and vulnerabilities in existing products.

The description of a path or location generally indicates a "path" where the artifact (i.e., target software to be fuzzed) is located. The path can be a public site location (e.g., a publicly accessible web address), a repository (e.g., a private or publicly accessible software repository), a directory in a local filesystem, or a copy of the target software can be transmitted directly, for example, in an archive or compressed file format or uncompressed format.

If the path is determined to be public, open source fuzzers may be placed at a higher priority of selection. If the path is internal and/or private, bespoke fuzzers may be placed at a higher priority of selection. For example, bespoke fuzzers may include fuzzers that are developed and tested within an enterprise (e.g., certain engineering and enterprise teams of the enterprise) and/or open source fuzzers that are transferred and executed internally (to the enterprise).

The description of fuzzing depth describes a "Depth" of fuzzing. For example, the described depth determines how many layers (e.g., from root) the fuzzer should traverse to address functions' testing. The depth parameter allows a fuzzer to determine creation of inputs that address a hierarchical testing. For example, if "Depth" is only selected to be 1, it refers to only fuzz functions seen at the root. This is analogous to black box testing as it only targets the outer layer.

The more depth requested, the more the fuzzer moves toward white-box testing. It may be desirable in some circumstances to tune this parameter to a value that is optimized in between values of approximately 4 and 6, such as is known as grey-box testing.

The description of static data describes "static" data that are required to be fuzzed and are only exclusive to the target software's type. Static data do not change throughout fuzzing but help guide the fuzzing in an orderly direction.

For example, the target software (e.g., artifact) may include a set of APIs, a binary, a project program (e.g., Java), a database (e.g., SQL), etc. Based on the artifact type, certain static data is identified to be provided to the fuzzing framework to direct fuzzing during runtime. For example, for API fuzzing, universally unique identifiers (UUID) are required for URL path parameters. These data are provided through the configuration data so that the selected fuzzer(s) can pick path parameter UUIDs and use them during fuzzing. For artifacts that require authentication, the fuzzer(s) may need access to, or credentials to access, the resource to be able to fuzz.

In addition to the configuration data, the software development platform 208 may also facilitate the creation of an optional "specification" file that provides a human-readable functional description of the target software to be fuzzed. The specification file may be described in a standard human-readable language, such as, for example, OpenAPI or YAML.

If the artifact-under-fuzz (i.e., target software) is a local program and not publicly available, the specification file may be a requirement for fuzzer automatic selection. In these scenarios, the framework 200 may utilize the specification file to determine the type of tests to run for discovering bugs. For example, if the specification is an artifact that contains a binary image, the fuzzing framework can select AFL fuzzer which is a binary fuzzer. For example, if the specification is describing APIs, the fuzzing framework can select RESTler and Schemathesis fuzzers, which are open-source API fuzzers. For example, if the description file describes numerous communications between a client and a server, the fuzzing framework prepares many requests to test the communication channel between the client and server. It is noted that while particular fuzzers are described here as being selected according to particular examples, these examples should not be construed as limiting of all possible implementations. For example, new fuzzers or other not mentioned specifically here may also be applicable depending upon the contents of the configuration data and/or the optional specification file.

As mentioned briefly above, the third party and open source services 220 may be in operative communication with the software development platform 208 and server 106 over the data network 105. In some implementations, the third party and open source services 220 may include, but are not limited to, software repositories, fuzzer repositories, software testing websites, APIs, and other suitable data sources and services useable in software development.

According to at least one implementation, the third party and open source services 220 include a repository or web-accessible set of software fuzzers, a description of each software fuzzer, and an input profile of each software fuzzer. The set of software fuzzers may be accessible over the network 105 and may allow the use of the fuzzer to test target software as described herein. The description of each software fuzzer may include a textual description of the purpose, function, and/or use of a particular software fuzzer. The description of each software fuzzer may further identify a developer of the fuzzer, an age or version of the fuzzer, and/or computational requirements of the fuzzer. The input profile of the fuzzer may identify a type and form of data injected into a target software by the fuzzer, during fuzz testing using the particular fuzzer.

Generally, the server 106 may include a logical or physical server having one or more computing devices (e.g., a cloud computing system, a rackmount server, a server computer, cluster of physical servers, virtual server, etc.). In some implementations, the server 106 may be an independent system, or be part of another system or platform.

In some implementations, the server 106 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the server 106 and to provide a developer with access to the features and services described above.

Generally, the server 106 may include various components and features including, for example, data store 204, dispatcher 206, fitting and analysis service 218, and reporting service 222.

In some implementations, the data store 204 may be a non-transitory computer readable memory (e.g., random access memory), a cache, a drive (e.g., a hard drive), a flash drive, a database system, or another type of component or device capable of storing data. The data store 204 may also include multiple storage components (e.g., multiple drives or multiple databases) that may also span multiple computing devices (e.g., multiple server computers). In some implementations, data store 204 may include cloud-based storage such as dynamic storage or other storage.

In some implementations, the dispatcher 206 is a component executed through the server 106 and configured to dispatch one or more fuzzers identified through the third party and open source services 220, to test and analyze target software. The dispatcher 206 may be configured to load target software, load the one or more identified fuzzers, and direct the one or more identified fuzzers to test the target software. In at least one implementation, the dispatcher 206 is further configured to determine any computational requirements for software testing through fuzzers, and automatically allocate appropriate computational resources for use by the one or more identified fuzzers. Furthermore, the dispatcher 206 may further be configured to loop or iterate through various iterations of software fuzz testing and direct any results to a logging or data aggregation service, such as reporting service 222.

In some implementations, the fitting and analysis service 218 is a component executed through the server 106 and configured to identify the one or more fuzzers from the third party and open source services 220, to test and analyze target software. For example, the fitting and analysis service 218 may be configured to interpret the software configuration data associated with the target software to determine an appropriate input profile that may be desirable for fuzz testing. The fitting and analysis service 218 may attempt to match (or at least partially match or correlate) various input sources for the target software to the input profiles of available software fuzzers. Thereafter, the fitting and analysis service 218 may transmit the fit and analysis of the target software to the dispatcher 206 such that the dispatcher 206 may appropriately dispatch fuzzers for target software testing.

In some implementations, the fitting and analysis service 218 includes a machine learning model configured to automatically analyze target software to aid in determining appropriate fuzzers needed for target software testing. The machine learning model may be selected and trained in many ways. For example, and without limitation, the machine learning model may be trained based on data included within the configuration data and/or the optional specification file.

Using the data provided in the configuration data and/or specification file, supervised learning models may be used to determine the type of, or a particular one or more of, fuzzers. Inputs to the machine learning pipeline may include the configuration data and specification files. The machine learning will determine the fuzzing exercise based on these two files. The machine learning model may be trained for fuzzing determined by multi-class logistic regression to predict the suitable fuzzer type (e.g., based on the content of the specification and configuration data files).

Phrase segmentation and natural language processing (NLP) is used such that the machine learning model understands the sequence of words from the configuration data and specification files. For situations that are hard to detect which fuzzer to use (for example, if the software artifact to fuzz is a combination of different source code and binary), kernels are employed that are based on a similarity function to decide which fuzzer types are needed. Support vector machine (SVM) can be used to bolster the similarity function outputs in such cases.

Additionally, a collection of training, cross-validation, and test data can be leveraged to tune the machine learning models used for fuzzer selection. For example, ceiling analysis may be used to help estimate errors to help put the most effort for fuzzing enhancement where accuracy requires improvement. For example, if the NLP sequence engine poorly interprets specifications and relationships between functions that are needed for fuzzing, dictionary algorithms are used to increase accuracy and help better understand the content of the artifact.

The example, Table 1 (below) demonstrates popular artifacts used in training the machine learning model. Artifact type can be a text, or binary. Content of an artifact can be a computer program, an executable, of a set of application interfaces. File extension determines the encoding of data stored in an artifact—for example, a filename ending in .c indicates the file is comprised of C programming language data and C functions. Therefore, fuzzer classes that are suitable to fuzz the C language and C functions should be selected. Finally, fuzz classification refers to popular fuzzers that are contemporaneously available. It is noted that these fuzzers described are not an exhaustive list of available fuzzers, and that new or other fuzzers may also be applicable.

TABLE 1

| Feature 1: artifact type | Feature 2: content | Feature 3: File extension | Fuzz classification |
|---|---|---|---|
| Text | Computer program source files | .c, .java, .jv, .cpp | Jazzer, LibFuzz |
| Binary | Computer program executables | .bin, .exe, .lib, .llb, .asm | AFL |
| Text | Cloud Application Interfaces | .yaml | Schemathesis RESTler |
| Text | URL | .com, .ca, .net | wfuzz Smart-url-fuzzer |

Additional features, such as "time budget", "depth", and "static" information that are parsed from the configuration data, can be used after fuzzing classification is determined, to help guide the fuzzing process during runtime. For example, if Jazzer is selected to fuzz a computer program project comprised of Java language, Jazzer will use "time budget" value (usually in hours) as the basis for time fuzzing.

The fitting and analysis service 218 can therefore provide, as an output of the trained machine learning model, a description or list of suitable fuzzers and/or identified artifacts, content, and file extension information.

Upon dispatching and testing the target software by both the fitting and analysis service 218 and the dispatcher 206, the reporting service may aggregate a report of testing results. For example, in some implementations, the reporting service 222 may be a component executed through the server 106 and configured to aggregate results from the one or more fuzzers based on testing of the target software. The reporting service 222 may also be configured to prioritize results for better display to developers, such that a holistic view of the software testing is presented through a user interface (e.g., user interface 212).

In at least one implementation, the reporting service 222 may categorize vulnerabilities that are identified into different groupings such as flaws, faults, failures, crashes, exploits, and/or other groupings. These categorized vulnerabilities may be further organized and normalized such that similar defects are presented in a meaningful manner to a developer. For example, severe software vulnerabilities may be categorized and presented first. Similarly, less severe software vulnerabilities may be categorized and presented after more severe vulnerabilities. Additionally, although described as prioritized and/or normalized, it should be understood that raw data results may also be organized by the reporting service 222 and stored at the data store 204 in unedited form. In this manner, other forms of abstraction may be performed on-the-fly on the raw data such that: primary testing results are retained in their raw form, and; further testing may be compared directly to raw data as well as to abstracted/prioritized data.

As described above, the framework 200 allows for software testing based on any number of fuzzers available through third party and open source services 220. Thus, a developer may create a piece of target software through the software development platform 208, and perform automated testing using applicable software fuzzers without necessitating research into particular forms of fuzzing or other esoteric testing requirements. Furthermore, by leveraging an iterative or repetitive approach, target software may be repeatedly tested using a relatively large number of fuzzers and/or different input profiles, thereby increasing the likelihood that software vulnerabilities are identified prior to software being rolled out publicly and/or execution of the software in a networked environment, such as the enterprise network 100.

Hereinafter, operations that may be performed by one or more components of FIG. 1 and FIG. 2 are described in more detail with reference to FIGS. 3-5.

Figure 3:
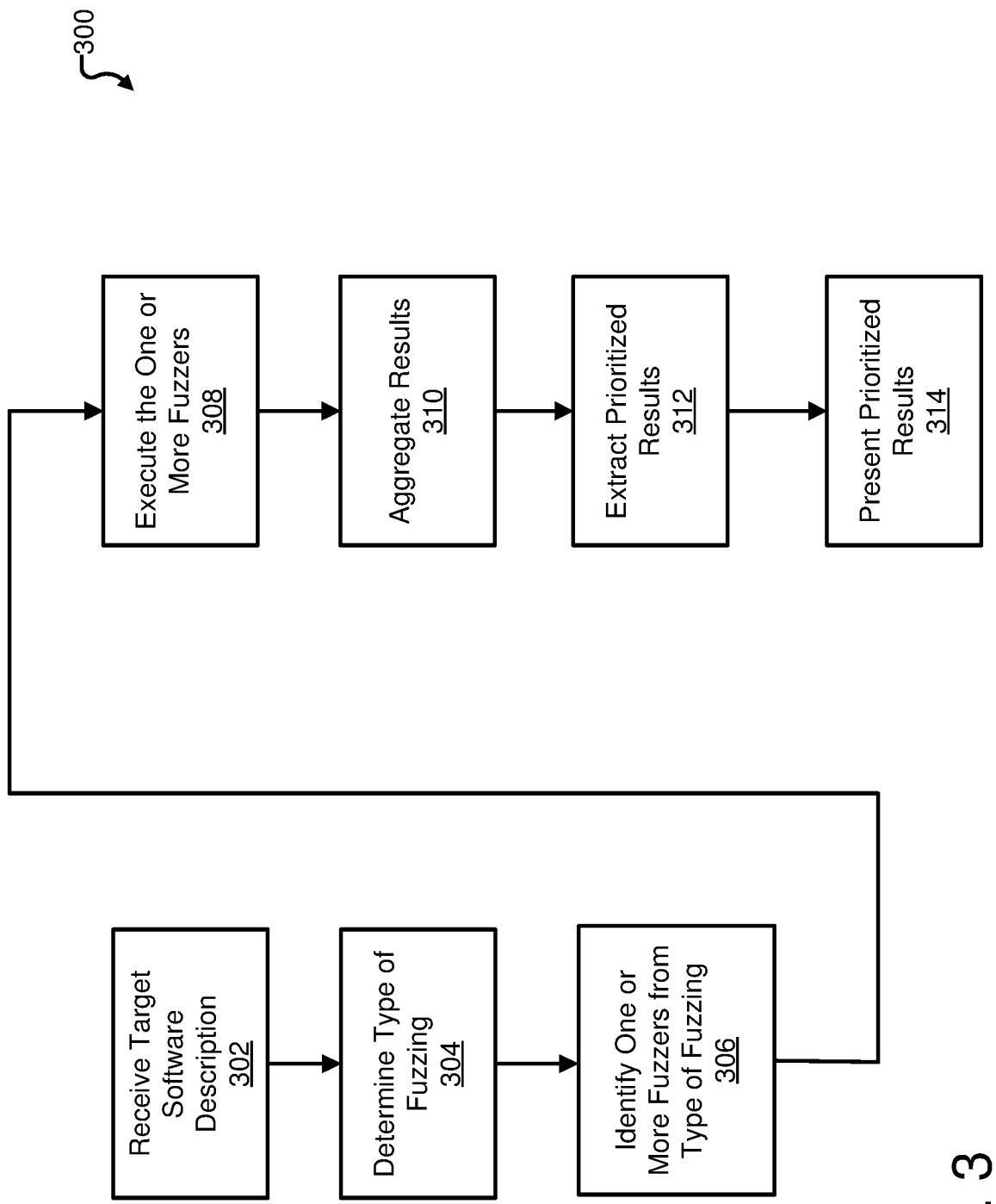
FIG. 3 is a flow diagram of an example method of automatic fuzz testing of software, in accordance with some implementations.

FIG. 3 shows a flow chart of an example method 300 of automatic fuzz testing of software. In general, various testing techniques are used to identify potential threats and vulnerabilities. For example, configuration data files and/or machine learning techniques may be used to evaluate target software to aid in choosing an appropriate fuzzer or multiple fuzzers for testing. By filtering and prioritizing testing results with these tools, automated vulnerability mitigation actions can be performed (e.g., software isolation, debugging tickets, etc.) and/or human intervention (e.g., guided debugging) can advantageously be directed toward contexts that are the most appropriate for a given set of prioritized results.

In some implementations, method 300 can be implemented, for example, on a server 106 described with reference to FIG. 1 and FIG. 2. In some implementations, some or all of the method 300 can be implemented on one or more client devices, on one or more developer devices, or on one or more server device(s), and/or on a combination of developer device(s), server device(s) and client device(s). In described examples, the implementing system includes one or more digital processors or processing circuitry ("processors"), and one or more storage devices (e.g., a data store 204 or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

In some implementations, the method 300, or portions of the method, can be initiated automatically by a system. In some implementations, the implementing system is a first device. For example, the method (or portions thereof) can be periodically performed, or performed based on one or more particular events or conditions, e.g., a number of exposed vulnerabilities being above a threshold, new categories of fuzzers becoming available to the automatic fuzz framework, and/or one or more other conditions occurring which can be specified in settings read by the method.

Method 300 may begin at block 302. At block 302, a description of a target software application is received. For example, configuration data based on a developer's selection of various configuration options may be received. The configuration data may be data that is selected through a GUI provided by software development platform 208, for example. The configuration data may be maintained as part of a given software application, where the configuration data provides information to be used in fuzz testing. The configuration data may be data directly described by a developer including: software language, software organization, input data sources, network activity, storage activity, and other data that identifies potential sources of software vulnerabilities. Therefore, block 302 can also include receiving a configuration file that includes a description of artifacts of the target software application, the artifacts including one or more of: code language or organization of code.

Furthermore, according to at least one implementation, the configuration data may also be input to a trained machine learning model configured to analyze the target software, the configuration data, and/or an optional specification file, and as an output, provide a listing of software characteristics (e.g., Table 1) useful in determining particular fuzzers for automated software testing and/or a listing of one or more fuzzers to use for fuzz testing. Therefore, block 302 can also include generating the description of the target software application using a machine learning algorithm, where the description includes one or more artifacts of the target software application that are representative of one or more of: code language or organization of code used in selecting the one or more fuzzers. The method 300 continues at block 304.

In block 304, a type of fuzzing is determined, based on the received description. For example, a list or description of available fuzzers may be received at the server 106 from third party and open sources 220. Using the received description or configuration data, the fitting and analysis service 218 may determine one or more fuzzers that are appropriate for fuzzing the target software. For example, Table 1 and associated description above provide examples of fuzzer selection. In this manner, block 304 can include determining a subset of available fuzzers, where each fuzzer of the subset of available fuzzers matches at least one of: code language of the target software application or organization of code of the target software application.

Other matching and/or partially matching techniques may be used. For example, available fuzzers may be ranked according to similarity to the received description and the one or more fuzzers may be chosen based on the raking. Thus, block 304 can also include ranking each fuzzer of the subset of fuzzers based on a similarity between an output profile of the fuzzer and the description of the target software application. The method 300 continues at block 306.

In block 306, one or more fuzzers are identified based on the type of fuzzing. For example, using the information from block 304, the fitting and analysis service 218 may identify particular fuzzers from the third party and open source services 220. An identifier for each fuzzer may be extracted or retrieved, and transmitted to the dispatcher 206. The method 300 continues at block 308.

In block 308, the one or more fuzzers are executed on the target software application. For example, upon identifying one or more available fuzzers based on the software description or configuration data described above, the dispatcher 206 may dispatch the fuzzers to test the target software. The dispatcher 206 may, for each identified fuzzer, provide an input profile of the target software application. Thereafter, the executing of the fuzzer may be performed within a time budget or a computational budget as determined by the dispatcher 206. Other types of budgets including budgets defined in FLOPS or some other unit, memory usage, CPU load, energy usage, etc. can also be used. The method 300 continues at block 310.

In block 310, results of the execution of the one or more fuzzers are aggregated. In at least one implementation, the results are aggregated into a log (e.g., raw data log) for storage at the data store 204. The results may also be at least partially categorized, normalized, and/or prioritized through one of the components of the server 106 (e.g., with reference to FIG. 2). However, raw results may always be stored, in one implementation, such that these raw results may be used subsequently in analysis of fuzzer performance or for other purposes. In aggregating the results, the reporting service 222 may, for each fuzzer, receive results from the fuzzer and store the results in the log. The method 300 continues at block 312.

In block 312, prioritized results are extracted from aggregated results. For example, the reporting service 222 may categorize exposed software vulnerabilities into one or more categories. The one or more categories may be populated with testing results. These categorized results may further be normalized and prioritized. In this manner, block 312 may include categorizing each of the aggregated results into one or more categories of software defects, for each category, prioritizing individual software vulnerabilities, outputting the prioritized individual software vulnerabilities organized based on the set of categories. The prioritized individual software vulnerabilities may then be ready for use by a developer for debugging the target software. The method 300 continues at block 314.

In block 314, the prioritized results are presented to the developer, for example, through a user interface. The prioritized results may be displayed as a listing or other graphical display. The graphical display may include interface elements allowing a developer to quickly identify code portions that may be the cause of the vulnerability. The graphical display may also allow the developer to generate or respond to software service tickets associated with the vulnerabilities. For example, in one implementation, the reporting service 222 may automatically open service ticks based on the prioritized results. These automatically opened service tickets may also be displayed on the graphical user interface for access by the developer.

As described above, various components of the system 100 and the automatic fuzzing framework 200 may be responsible for performing some or all of the blocks presented above with reference to FIG. 3. Hereinafter, a more detailed discussion of responsible components is presented with reference to FIG. 4, which mimics the overall data flow of method 300.

Figure 4:
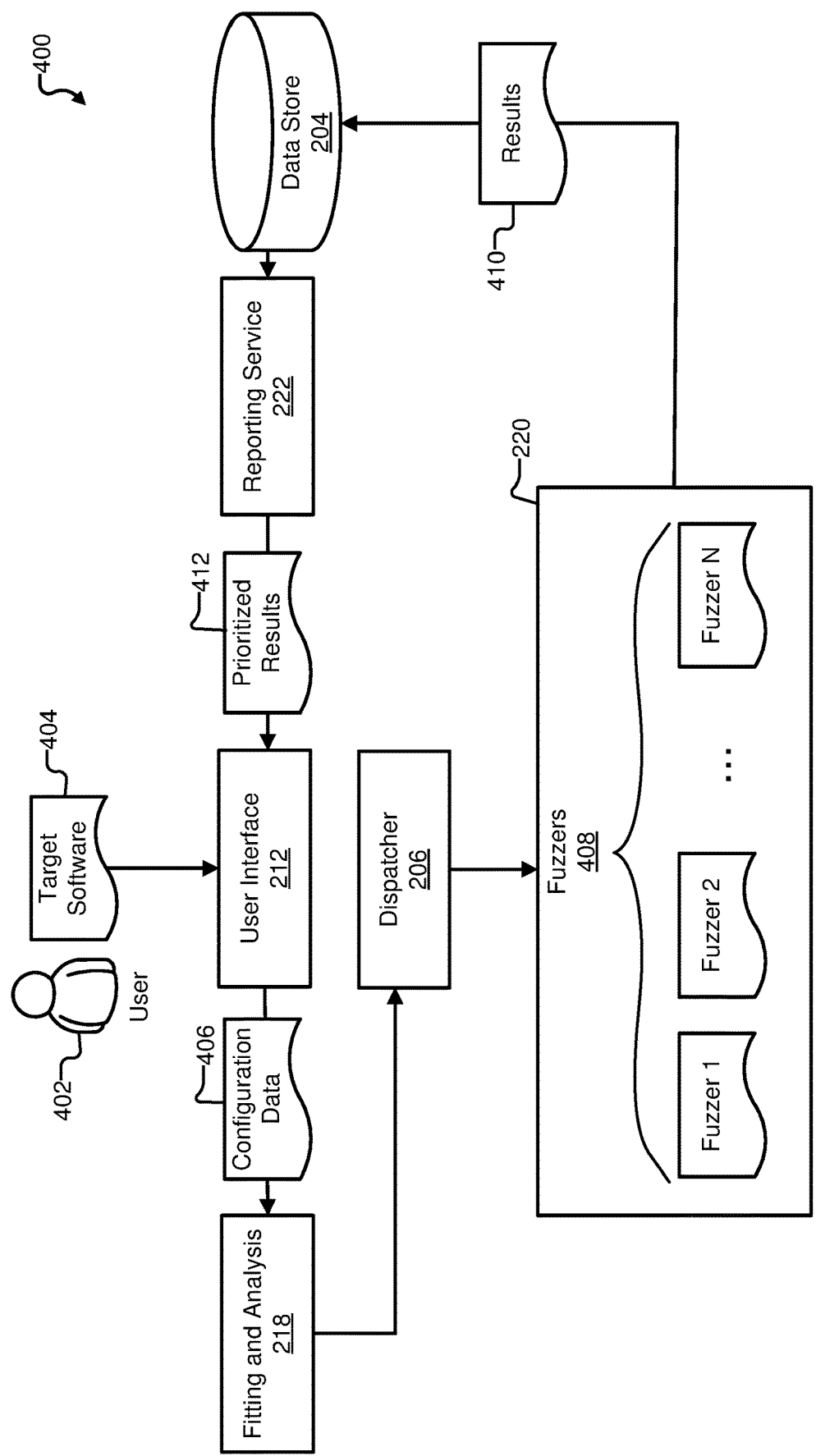
FIG. 4 is an alternate diagram of an example method of automatic fuzz testing of software, in accordance with some implementations.

FIG. 4 is an alternate diagram of an example method 400 of automatic fuzz testing of software, in accordance with some implementations. As illustrated, a user or developer 402 may create, edit, modify, and otherwise develop target software 404. The target software 404 may be an individual component of a larger suite of software, or may be a standalone application or executable. The target software 404 may be developed using a software development platform, such as software development platform 208.

Utilizing the user interface 212 of the software development platform 208, the user 402 may create configuration data 406. The configuration data 406 is substantially similar to the software description detailed above with reference to block 302 of the method 300. The configuration data 406 may also be created through selection of a listing of applicable software aspects, such as code language, code organization, software type, and other similar aspects, by the user 402. The configuration data 406 may also be input into a trained machine learning model such that the trained machine learning model can determine an appropriate type of fuzzer, automatically.

The configuration data 406 may be transmitted to the fitting and analysis service 218. The fitting and analysis service 218 may determine one or more fuzzers 408, from the third party and open source services 220 that are suitable to test the target software 404, using the configuration data 406. The fitting and analysis service 218 may transmit the identified fuzzers 408 to the dispatcher 206.

The dispatcher 206 may calculate a time budget, computational budget, or other set of constraints for software testing. The dispatcher may dispatch the identified fuzzers 408 to automatically fuzz the target software 404 based on the calculated budget.

Results 410 of the automated fuzzing of the target software 404 may be aggregated and stored in raw data form at the data store 204. The reporting service 222 may categorize, normalize, and/or prioritize the results to create prioritized results 412, for presentation to the user 402. The prioritized results 412 may be presented through the user interface 212 (or an additional interface) such that the user 402 may take appropriate remedial actions to mitigate the software vulnerabilities. For example, automated service tickets may be opened for the user 402, and/or results may be displayed for immediate action by the user 402.

It is noted that iterative refinement and/or iterative training of the noted machine learning model (based on the configuration data 406 and other data), may also be implemented in method 400. For example, the configuration data 406 specifies parameters to help guide fuzzing in runtime. The fuzzing framework can also use historical data from vulnerability findings to determine how to determine vulnerabilities that are more actionable. Using logs and reports, a selected fuzzer will be able to triage the issues with more certainty by further training the machine learning model with a real-time recommendation feedback.

For example, if there are more bugs discovered (than an average factor) of an artifact, the recommender system shall give feedback to the machine learning model that next time more time of fuzzing must be specified to fuzz the same artifact. This information is also made available to the user as a recommendation.

As another example, if the code coverage during fuzzing is not over a certain passing threshold (e.g. 50%), the fitting and analysis component 218 can dictate the machine learning model to select a more aggressive fuzzing practice (either by choosing multiple fuzzers to run in parallel, or by increasing time of fuzzing, or by going deeper with creating thorough tests). With the help of the user 402 and the trained machine learning model, issues logged should over time become clearer with less false positives.

Hereinafter the display of the prioritized results 412 is described more fully with reference to FIG. 5.

Figure 5:
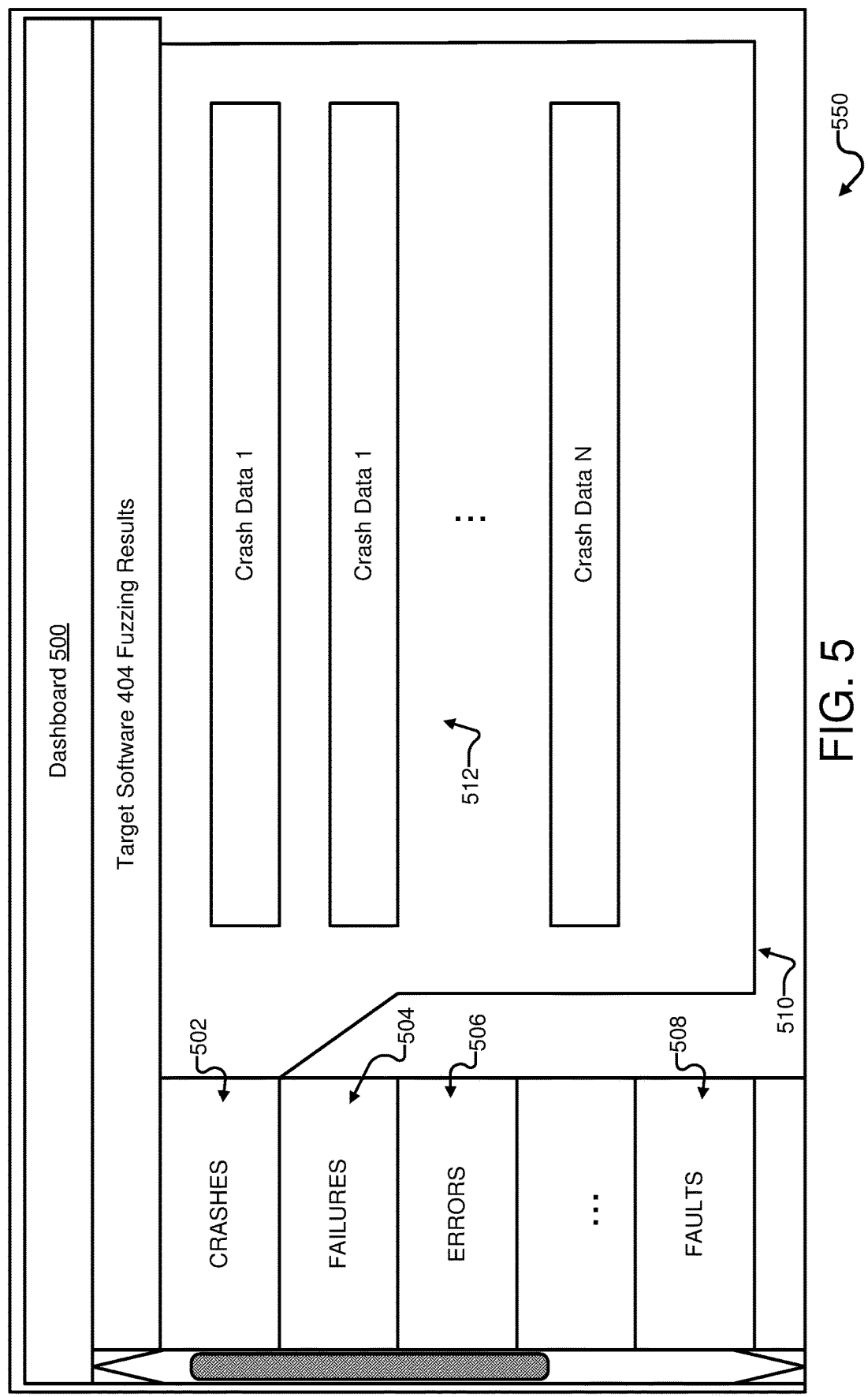
FIG. 5 is a diagram of an example user interface for presenting results of automatic fuzz testing of software, in accordance with some implementations.

FIG. 5 is a diagram of an example user interface 550 for presenting prioritized results 412 and/or raw results 410 of automatic fuzz testing of software, in accordance with some implementations. The user interface 550 may be presented as a portion of the user interface 212, in some implementations. In other implementations, the user interface 550 may be a separate and/or unique interface provided by an automated testing framework such as the framework 200.

The interface 500 may include a main dashboard 500 that identifies target software 404's fuzzing results. The fuzzing results may be organized into one or more categories. For example, categories 502, 504, 506, and 508 are provided as examples. It should be readily understood that these categorizes are examples only, and are not to be construed as limiting of every possible implementation. More or fewer categories, or different category descriptions are also applicable.

Each category 502-508 may be selectable by the user 402 such that detailed categorized results 510 may be displayed. The detailed categorized results 510 may include prioritized data 512 that is a subset of raw data, that is a listing of software service tickets, that is a listing of vulnerabilities data, that is a listing of prioritized data, or that is any suitable listing of testing results. It should also be readily understood that other display and presentation techniques, including heat maps, graphical elements, links to code portions, and virtually any other format of display is applicable.

Using the interface 550, the user 402 may identify the software vulnerabilities, and begin to perform software debugging in any appropriate manner such that these identified vulnerabilities are satisfactorily mitigated.

As described above, systems, methods, and various components are configured to implement an automatic fuzz testing framework. The framework for automatic fuzz testing of software may automatically determine an appropriate fuzzer (or multiple fuzzers) for software testing, deploy testing with the fuzzer (or multiple fuzzers), and organize results of the fuzz testing for display to a developer. The fuzz testing results may be organized based on a hierarchy or priority of software vulnerabilities, such that a developer may more readily concentrate on securing or managing the most urgent vulnerabilities. Further iteration through the framework for automatic fuzz testing, and organization of the plurality of results of the iterative fuzz testing, may result in a holistic view of software vulnerabilities that otherwise may have been missed when using only a default or basic fuzzer, or using an inappropriate fuzzer based on the target software application.

Hereinafter, a more detailed description of various computing devices that may be used to implement different devices (e.g., the server 106 and/or endpoints 102) illustrated in FIG. 1 and FIG. 2 is provided with reference to FIG. 6.

Figure 6:
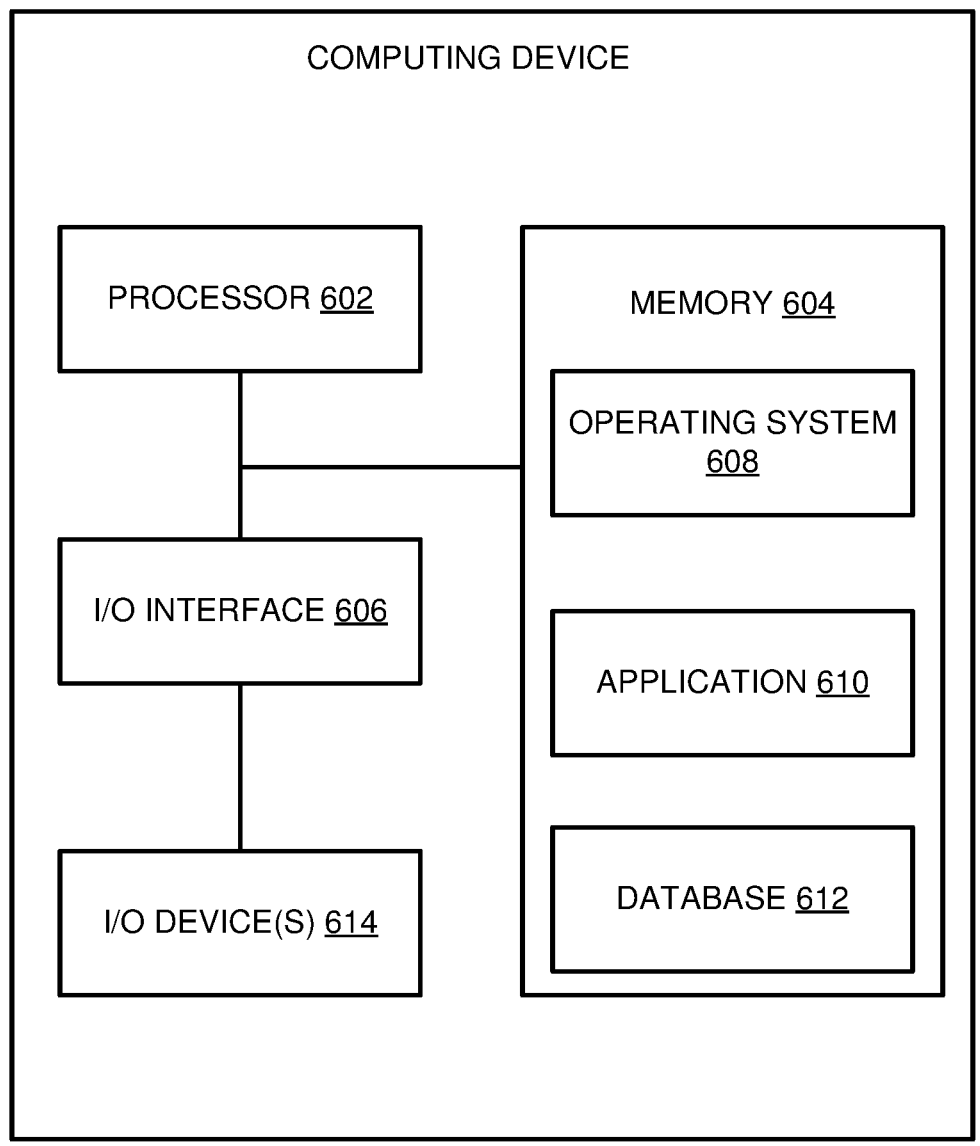
FIG. 6 is a block diagram illustrating an example computing device which may be used to implement one or more features described herein, in accordance with some implementations.

FIG. 6 is a block diagram of an example computing device 600 which may be used to implement one or more features described herein, in accordance with some implementations. In one example, device 600 may be used to implement a computer device, and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614 (e.g., display screen, touchscreen, display goggles or glasses, audio speakers, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, an application or computer program product 610, and a database 612.

Memory 604 can include software instructions for executing the operations as described with reference to FIGS. 1-5. Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 204), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, software blocks 608, and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a user device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more user devices, servers, and threat management facilities. In some implementations, one or more methods described herein can be implemented, for example, on a server system with a dedicated threat management facility, automated fuzz testing framework, and/or on both a server system and any number of threat management facilities and testing frameworks. In some implementations, different components of one or more servers and or user devices can perform different blocks, operations, or other parts of the methods.

One or more methods described herein (e.g., method 300 or 400) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
   receiving a description of a target software application;
   determining, based on the description, a type of fuzzing by determining a subset of available fuzzers, wherein each fuzzer of the subset of available fuzzers matches at least one of:
   code language of the target software application or organization of code of the target software application;
   identifying one or more fuzzers based on the type of fuzzing;
   executing the one or more fuzzers on the target software application;
   extracting prioritized results of the executing of the one or more fuzzers; and
   presenting the prioritized results.

2. The computer-implemented method of claim 1, wherein the prioritized results are extracted from a log, and wherein the method further comprises:
   prior to the extracting, aggregating results of the executing of the one or more fuzzers into the log.

3. The computer-implemented method of claim 1, further comprising:
   generating the description of the target software application using a machine learning algorithm, wherein the description includes one or more artifacts of the target software application that are representative of one or more of: code language or organization of code.

4. The computer-implemented method of claim 1, wherein receiving the description of the target software comprises receiving a configuration file that includes a description of artifacts of the target software application, the artifacts including one or more of: code language or organization of code.

5. The computer-implemented method of claim 1, wherein the identifying the one or more fuzzers comprises ranking each fuzzer of the subset of fuzzers based on a similarity between an output profile of the fuzzer and the description of the target software application.

6. The computer-implemented method of claim 1, wherein the executing the one or more fuzzers on the target software application comprises, for each fuzzer, providing an input profile of the target software application, wherein the executing is performed within a computational budget.

7. The computer-implemented method of claim 2, wherein the aggregating the results of the executing of the one or more fuzzers comprises, for each fuzzer, receiving results from the fuzzer and storing the results in the log.

8. The computer-implemented method of claim 1, wherein the extracting the prioritized results comprises:
   categorizing each of the aggregated results into one or more categories of software defects;
   for each category, prioritizing individual software vulnerabilities; and
   outputting the prioritized individual software vulnerabilities organized based on the one or more categories.

9. The computer-implemented method of claim 1, further comprising automatically opening a service ticket indicative of a software vulnerability based on the prioritized results.

10. A non-transitory computer-readable medium with instructions stored thereon that, responsive to execution by a processing device, causes the processing device to perform operations comprising:
    receiving a description of a target software application;
    determining, based on the description, a type of fuzzing by determining a subset of available fuzzers, wherein each fuzzer of the subset of available fuzzers matches at least one of: code language of the target software application or organization of code of the target software application;
    identifying one or more fuzzers based on the type of fuzzing;
    executing the one or more fuzzers on the target software application;
    extracting prioritized results of the executing of the one or more fuzzers; and
    presenting the prioritized results.

11. The non-transitory computer-readable medium of claim 10, wherein the operations further comprise:
    generating the description of the target software application using a machine learning algorithm, wherein the description includes one or more artifacts of the target software application that are representative of one or more of: code language or organization of code.

12. The non-transitory computer-readable medium of claim 10, wherein receiving the description of the target software comprises receiving a configuration file that includes a description of artifacts of the target software application, the artifacts including one or more of: code language or organization of code.

13. The non-transitory computer-readable medium of claim 10, wherein the identifying the one or more fuzzers comprises ranking each fuzzer of the subset of fuzzers based on a similarity between an output profile of the fuzzer and the description of the target software application.

14. The non-transitory computer-readable medium of claim 10, wherein the executing the one or more fuzzers on the target software application comprises, for each fuzzer, providing an input profile of the target software application, wherein the executing is performed within a computational budget.

15. The non-transitory computer-readable medium of claim 10, wherein the aggregating the results of the executing of the one or more fuzzers comprises, for each fuzzer, receiving results from the fuzzer and storing the results in a log.

16. The non-transitory computer-readable medium of claim 10, wherein the extracting the prioritized results comprises:
    categorizing each of the aggregated results into one or more categories of software defects;
    for each category, prioritizing individual software vulnerabilities; and
    outputting the prioritized individual software vulnerabilities organized based on the one or more categories.

17. The non-transitory computer-readable medium of claim 10, wherein the operations further comprise automatically opening a service ticket indicative of a software vulnerability based on the prioritized results.

18. A computer system to perform automatic fuzz testing, comprising:
    a memory with instructions stored thereon; and
    a processing device, coupled to the memory, the processing device configured to access the memory and execute the instructions, wherein the instructions cause the processing device to perform operations including:

receiving a description of a target software application;

determining, based on the description, a type of fuzzing by determining a subset of available fuzzers, wherein each fuzzer of the subset of available fuzzers matches at least one of: code language of the target software application or organization of code of the target software application;

identifying one or more fuzzers based on the type of fuzzing;

executing the one or more fuzzers on the target software application;

aggregating results of the executing of the one or more fuzzers into a log;

extracting prioritized results from the log of aggregated results; and presenting the extracted prioritized results in a graphical user interface, wherein the graphical user interface is configured to display higher priority software vulnerabilities to a user automatically.

* * * * *